Aug. 3, 1965 C. J. DI PERNA 3,198,002
LABORATORY METHOD OF AND APPARATUS FOR DETERMINING
LOW SPEED ROAD OCTANE NUMBERS OF FUELS
Filed April 19, 1962 5 Sheets-Sheet 1

INVENTOR.
COSMO J. DI PERNA
BY
ATTORNEYS

INVENTOR.
COSMO Di PERNA

United States Patent Office 3,198,002
Patented Aug. 3, 1965

3,198,002
LABORATORY METHOD OF AND APPARATUS FOR DETERMINING LOW SPEED ROAD OCTANE NUMBERS OF FUELS
Cosmo J. Di Perna, Haddonfield, N.J., assignor to Socony Mobil Oil Company, Inc., a corporation of New York
Filed Apr. 19, 1962, Ser. No. 189,669
9 Claims. (Cl. 73—35)

This invention relates to testing procedures and, more particularly, to a testing procedure for determining the low speed road octane number of a test fuel.

The octane number of a test fuel is determined at the present time in research and testing laboratories by using the fuel in a combination of a single cylinder internal-combustion testing engine approved by the American Society For Testing Materials (ASTM) and a manifold system for supplying a charge mixture of fuel and air to the engine and observing the knocking characteristic of the fuel in the engine. The combination is arranged and adapted to vary engine operating parameters, such as engine compression ratio, and detection of the character of combustion in the cylinder of the engine facilitates a determination of the knocking propensity of the fuel. This knocking characteristic is then compared with similar characteristics obtained for reference fuels of known octane numbers used to operate the same engine, and the octane number of the test fuel is determined by bracketing its characteristic between those of two reference fuels of closely related octane numbers.

It has been found from practice that the octane numbers determined in the laboratory through the use of the ASTM single cylinder octane engine oftentimes do not closely correlate with the octane numbers obtained for the fuel by test in an automobile operated in an actual road test. This is especially true with automobiles employing manual transmissions in which, at lower engine speeds and full throttle, the fuel-air mixture supplied to the multicylinder engine is not the same as the mixture supplied to the single cylinder testing engine used in the laboratory, thereby resulting in a different knocking characteristic. Automobiles having automatic transmissions generally do not present this problem, since a full throttle condition is accompanied by a relatively high engine speed and a relatively uniform fuel-air mixture.

Various approaches have been taken to simulate the effect of fuel-air maldistribution which takes place in the engine of a manual transmission automobile at low speed and full throttle in a road test. One of these approaches is outlined in a paper entitled "New Knock-Testing Methods Needed to Match Engine And Fuel Progress" delivered by Earl Batholomew at the 1961 S.A.E. International Congress and Exposition of Automotive Engineering at Cobo Hall, Detroit, Michigan, on January 9–13, 1961.

There is shown in FIGURE 25 of that paper a "bled" manifold for use in conjunction with the single cylinder ASTM octane engine, in which provision is made to condense out a portion of the fuel mixture in the manifold and to prevent this condensed out portion of the mixture from entering the engine. It is believed that the mixture applied to the engine using the bled manifold more closely approximates the mixture actually applied to the engine of a manual transmission automobile in a road test under low speed and full throttle conditions in which heavier fuel fractions tend to separate from the fuel-air mixture and remain on the engine intake manifold surface until a higher level of speed is reached.

Although the octane numbers determined for some fuels by using the "bled" manifold with the ASTM laboratory octane engine correlate well with the octane numbers determined in road tests, the correlations for other fuels are notably poor. In particular, it has been found that the ASTM engine equipped with the bled manifold indicates greater differences between fuels containing tetraethyl lead (TEL) and the same fuels containing lead alkyls more volatile than TEL than are found by road test. This poor correlation between ASTM engine tests with the bled manifold and road tests is due to the relatively sharp fractionation of liquid and vapor taking place in the bled manifold wherein too much of the heavy fuel components and TEL is drained from the manifold. Therefore, the ratings of the fuels containing TEL are too low relative to the ratings of the same fuels containing more volatile lead alkyls.

In contrast, relatively poor separation takes place in the car engine. In an automobile, fuel reaching the various cylinders exists in three phases—vaporized fuel, a fine mist of unvaporized fuel, and large liquid droplets. Thus, while a portion of the heavy fuel components remains on the manifold wall, another broad range of heavy fuel components, including TEL, for example, reaches the engine cylinders. In the bled manifold, the separation of heavy and light components is relatively sharp and, while the amount of material bled can be varied by changes in the water jacket temperature, there is no means of bleeding only a portion of a broad range of heavy hydrocarbons while keeping another portion of this same boiling range material in the fuel-air mixture introduced into the combustion chamber.

The present invention provides an improved method of determining the low speed road octane numbers of fuels in the laboratory using the standard ASTM single cylinder octane engine so that the octane numbers determined therefor correlate extremely well with the numbers determined for the same fuels in actual road tests. In particular, for the laboratory test, the fuel forming a part of the charge mixture applied to the single cylinder ASTM engine is modified, and hence the charge mixture itself is modified, in a manner described in greater detail below, so that the knocking observed corresponds to that observed for the same fuel in a multicylinder engine of a manual transmission automobile in a road test under low speed and full throttle conditions when a portion of a broad range of heavy hydrocarbons and a lead alkyl antiknock additive remain on the intake manifold wall and do not enter the engine.

In a preferred embodiment the fuel, after vaporization and admixture with air, but prior to its introduction into the engine, has removed therefrom certain critical percentages of the total mixture and of the lead alkyl antiknock additive. Specifically, from 10 to 35% of the total mixture, depending upon the ASTM evaporation temperature of the mixture, and from 17 to 65% of the lead alkyl antiknock additive, depending upon the average boiling point of the additive, are removed. It has been found that if substantially no more than $$\left(124 - \frac{2.3}{12} \text{ Ev. } T_1\right) \text{percent}$$

and no less than $$\left(115 - \frac{2.3}{12} \text{ Ev. } T_1\right) \text{percent}$$

of the mixture is applied to the laboratory engine, where Ev.$T_1$ is the ASTM 50% evaporation temperature in degrees Fahrenheit of the mixture, and this includes substantially no more than $$\left(133 - \frac{7}{32} \text{ A.B.P.}\right) \text{percent}$$

and no less than $$\left(120 - \frac{7}{32} \text{ A.B.P.}\right) \text{percent}$$

of the lead alkyl antiknock additive, where A.B.P. is the average boiling point in degrees Fahrenheit of the additive, then the knocking observed in the engine under standard ASTM Research Test conditions will correlate very closely with the knocking determined in a multi-cylinder engine in a road test using the test fuel.

Modification of the test fuel in the manner indicated is preferably effected by an improved bled manifold which receives the vaporized fuel admixed with air from a carburetor and supplies it after modification to the standard test engine.

Briefly, the amount of separation taking place between liquid and vapor inside the manifold is reduced by taking a portion of the hydrocarbon and antiknock additive fraction separated or condensed from the fuel-air mixture in the manifold and normally bled therefrom and reentraining it into the mixture supplied to the laboratory testing engine. The boiling range of the material to be separated is controlled by the manifold jacket temperature as is the case with the unimproved bled manifold. However, because of the reentrainment feature, the improved manifold can be operated at a lower temperature to condense out a broad range of heavy fuel components, including TEL, for example. The unimproved bled manifold cannot be operated at the advantageous lower temperature because too broad a range of heavy fuel components will be bled away.

In this fashion, because of the reentrainment feature, the engine mixture with the improved bled manifold contains a broader range of heavy fuel components, including TEL, for example. At the same time, the correct amount and composition is bled away and the mixture more closely simulates that supplied to an automobile engine in a road test. In particular, the present invention when installed on an ASTM engine provides a closer prediction of the road octane number performance of fuels containing lead alkyls more volatile than TEL relative to fuels containing TEL.

In an illustrative embodiment of the invention, the chamber forming the bled manifold contains a trough therein which bridges the inlet and the outlet of the chamber and which receives a portion of the fuel condensed or separated out of the fuel-air mixture in the chamber. The condensate received by the trough is reentrained in the fuel-air mixture applied through the outlet of the manifold to the intake port of the engine to increase the proportion of heavy fuel components and TEL present in the mixture.

The condensing properties of the manifold chamber are varied by changing the temperature of the chamber. This is accomplished in one form of the invention by enclosing the chamber in a second chamber through which a coolant is passed, thereby establishing the temperature of the first chamber and its condensing properties. In another embodiment of the invention, a condenser is inserted into the manifold chamber which further varies the condensing properties of the chamber.

A detailed description follows of a representative embodiment of the invention described in general terms above, which is to be read in conjunction with the appended drawings, in which.

Figures 1, 2, 3:
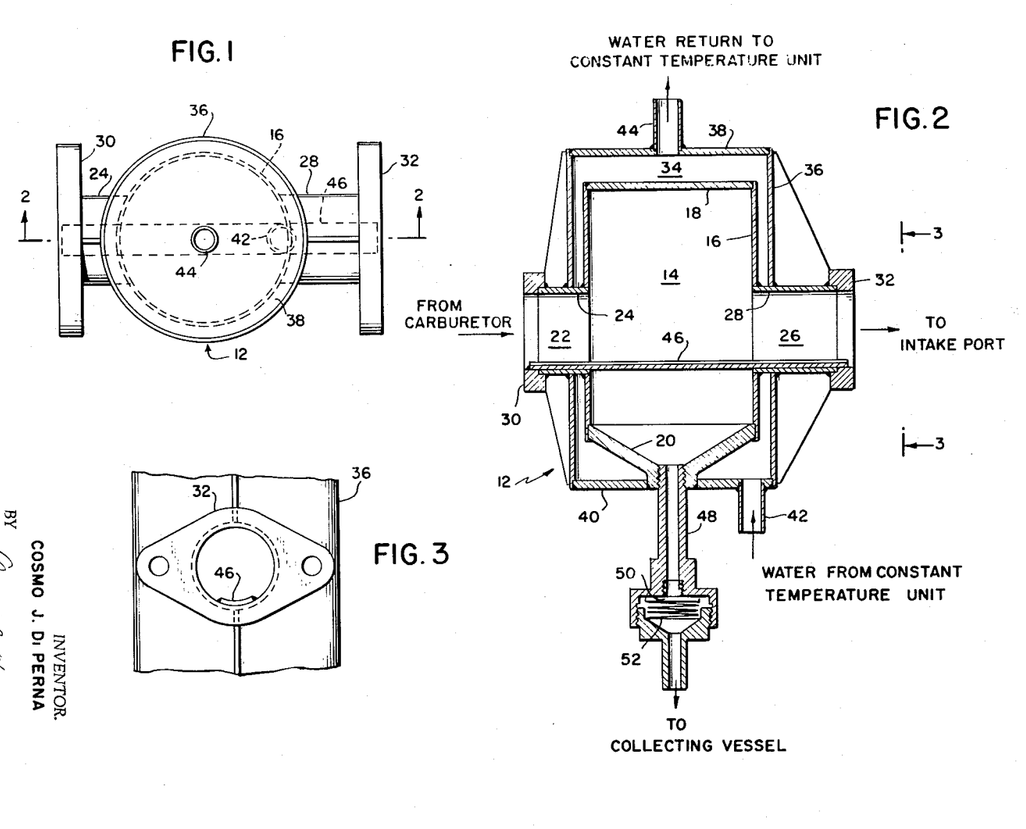
FIG. 1 is a top view of an improved bled manifold in accordance with the invention.
FIG. 2 is a sectional view of the manifold shown in FIG. 1, taken generally along the section line 2—2 of that figure and looking in the direction of the arrows.
FIG. 3 is a partial side view of the manifold shown in FIGS. 1 and 2.

Referring to FIGS. 1 through 3, an improved bled manifold 12 in accordance with the invention, which hereinafter will be referred to as a "liquid entrainment manifold," comprises a first chamber 14 formed from a cylindrical vessel 16 enclosed by a top plate 18 and having a bottom funnel-like portion 20. The interior surfaces of the chamber 14 constitute cooling surfaces defining a passage in the manifold system for condensing a portion of the fuel passing therethrough, as will presently appear. The chamber 14 has an inlet 22 formed from a pipe section 24 and an outlet 26 formed from a pipe section 28. The pipe section 24 terminates in an inlet flange 30 which is adapted to be attached to the outlet flange of a carburetor (not shown). Similarly, the outlet pipe section 28 terminates in an outlet flange 32 which is adapted to be attached to the intake port (not shown) of a standard single cylinder ASTM octane engine for laboratory use, with which the liquid entrainment manifold 12 is designed to operate.

The chamber 14 is enclosed within another chamber 34 which is formed from a cylinder 36 having a top plate 38 and a bottom plate 40. A suitable coolant, such as water from a constant temperature unit (not shown), is supplied to the chamber 34 through an inlet pipe 42 and is discharged from the chamber 34 through an outlet pipe 44 which returns the water to the constant temperature unit. The temperature of the water in the chamber 34 determines the temperature of the walls of the chamber 14 and, therefore, the condensing or separating characteristics of the chamber. A useful wall temperature has been found from practice to be 40° Fahrenheit. The condensing action of the chamber 14 is as follows:

As the fuel-air mixture from the carburetor (not shown) is applied to the chamber 14 through the inlet 22, the mixture within the chamber tends to partially condense. The resulting condensate is separated into two parts of like composition by means including a trough 46 and a second outlet member 48. Part of the condensate is received upon the trough 46 which bridges the inlet 22 and the outlet 26. As may be seen from FIG. 3, the trough 46 may be formed from a section of a pipe subtending an angle of 35° about the common axis of the inlet 22 and outlet 26, for example. The condensate from the fuel-air mixture in the chamber 14 received on the trough 46 is carried through the outlet 26 in the form of liquid droplets and into the intake port (not shown) of the testing engine for combustion in the cylinder of the engine.

Disposed below the trough 46 and threaded into the funnel-shaped bottom portion 20 of the chamber 14 is the second outlet member 48. The outlet member 48 includes a plate 50 which is biased upwardly by a spring 52 to close off the outlet member. As condensate not received on the trough 46 collects in the outlet member 48, the weight of the condensate forces the plate 50 downwardly, thereby allowing the condensate to flow outwardly through the outlet member to a collecting vessel (not shown). Normally, however, the outlet member 48 is closed by the plate 50 to maintain a vacuum at all times within the chamber 14. In any case, the condensate not received on the trough 46 is rejected from the combination of manifold system and test engine unburned.

As may be seen, the trough 46 receives a portion of the condensate from the fuel-air mixture that would normally be discharged through the outlet 48. This portion of the condensate is reentrained in the fuel-air mixture which is applied through the outlet 26 to the intake port of the laboratoy testing engine. Thus, the fuel-air mixture applied to the testing engine has its proportion of heavy fuel components and TEL antiknock additive increased, thereby more closely simulating the fuel-air mixture entering the engine of a manual transmission automobile in a road test involving low speed and full throttle conditions.

With the standard single cylinder ASTM CFR octane engine operated under standard research test conditions, a manifold of the following dimensions was found to provide test results for a number of different fuel mixtures which correlated well with those obtained by actual road tests. The cylindrical vessel 16 forming the manifold chamber 14 was approximately 2½ inches in inside diameter and 4⅜ inches long. The pipe sections 24 and 28 were approximately 1¼ inches in inside diameter and 1 and 1½ inches long, respectively, and were positioned with their longitudinal axes approximately 2¼ inches below the top plate 18. The trough 46 was approximately 4¹⁵⁄₁₆ inches long and, as pointed out above, was formed from a section of a pipe subtending an angle of approximately 35° about the common axis of the inlet 22 and outlet 26. The trough was located about 2¾ inches below the top plate 18. The cylinder 36 forming the chamber 34 was approximately 3¼ inches in inside diameter and 5⁷⁄₁₆ inches long.

That the "entrainment manifold" described above effects the desired modification of the test fuel for good correlation between road test and laboratory test results has been verified by extensive tests made on a wide range of fuel mixtures containing different amounts and types of lead alkyl additives. Table 1 lists the identifying properties of a number of fuel mixtures that were used in such tests.

fuel mixture at 100° Fahrenheit, with the liquid fuel in equilibrium with its vapor.

(3) ASTM distillation characteristics: I.B.P. is the initial boiling point of the fuel mixture; the temperatures of the mixture when 10%, 50%, and 90% of the mixture have been evaporated are also specified; and EP is the end point temperature of the mixture when all of the mixture has been evaporated.

(4) FIA analysis: Fluorescent Indicator Adsorption analysis of the fuel mixture according to ASTM test D1319 showing the volume percentages of aromatics, olefins, and saturates in the mixture.

Each of the fuels of Table 1 contained a lead alkyl antiknock additive, as specified in the following Table 2.

TABLE 2

Separation characteristics of distribution manifold (I) TML $(CH_3)_4Pb$ (230° F., B.P.)

| | Lead Content of Total Fuel, grams Pb/Gal. | Volume Percent Withdrawn | | Volume Percent To Engine | |
|---|---|---|---|---|---|
| | | Fuel | Lead | Fuel | Lead |
| A-2 | 1.03 | 20.4 | 27.5 | 79.6 | 72.5 |
| A-4 | 3.06 | 19.4 | 21.2 | 80.6 | 78.8 |
| A-6 | 1.06 | 18.2 | 25.0 | 81.8 | 75.0 |
| A-8 | 3.21 | 17.4 | 22.0 | 82.6 | 78.0 |
| A-10 | 1.03 | 22.0 | 24.6 | 78.0 | 75.4 |
| A-12 | 3.14 | 21.2 | 25.0 | 78.8 | 75.0 |
| A-14 | 1.10 | 26.8 | 28.0 | 73.2 | 72.0 |
| A-16 | 3.20 | 26.8 | 27.3 | 73.2 | 72.7 |
| B-2 | 2.18 | 17.4 | 23.0 | 82.6 | 77.0 |
| B-4 | 2.14 | 16.0 | 21.5 | 84.0 | 78.5 |
| B-6 | 2.18 | 26.0 | 27.5 | 74.0 | 72.5 |
| B-8 | 2.12 | 14.8 | 20.4 | 85.2 | 79.6 |
| B-10 | 2.08 | 22.2 | 28.0 | 77.8 | 72.0 |
| B-12 | 3.22 | 29.2 | 28.2 | 70.8 | 71.8 |
| B-14 | 3.43 | 18.2 | 20.0 | 81.8 | 80.0 |
| B-16 | 3.34 | 22.8 | 21.5 | 77.2 | 78.5 |
| B-18 | 3.30 | 22.6 | 24.8 | 77.4 | 75.2 |
| B-20 | 3.29 | 18.4 | 21.2 | 71.6 | 78.8 |
| C-1 | 1.11 | 22.4 | 26.0 | 77.6 | 74.0 |
| C-5 | 2.46 | 23.2 | 25.6 | 76.8 | 74.4 |
| C-9 | 1.10 | 19.2 | 26.2 | 80.8 | 73.8 |
| C-14 | 2.25 | 19.2 | 25.0 | 80.8 | 75.0 |

TABLE 1

Laboratory fuel inspection data

| Fuel | Gravity (°API) | Reid Vapor Pressure (lbs.) | ASTM Distillation (° F.) | | | | | FIA Analysis (Vol. Percent) | | |
|---|---|---|---|---|---|---|---|---|---|---|
| | | | IBP | 10% | 50% | 90% | E.P. | Aromatics | Olefins | Saturates |
| Program A: | | | | | | | | | | |
| A1 to A5 | 62.1 | 10.1 | 81 | 117 | 191 | 327 | 405 | 31 | 2 | 67 |
| A6 to A10 | 64.6 | 9.7 | 91 | 121 | 185 | 316 | 387 | 24 | 11 | 65 |
| A11 to A15 | 65.7 | 9.5 | 79 | 121 | 199 | 303 | 352 | 14 | 36 | 50 |
| A16 to A20 | 60.3 | 10.6 | 75 | 118 | 230 | 338 | 388 | 26 | 34 | 40 |
| Program B: | | | | | | | | | | |
| B1 & B2 | 61.6 | 9.8 | 95 | 127 | 190 | 325 | 405 | 28 | 7 | 65 |
| B3 & B4 | 61.9 | 9.2 | 96 | 129 | 190 | 301 | 381 | 24 | 13 | 63 |
| B5 & B6 | 59.0 | 9.0 | 95 | 132 | 227 | 380 | 414 | 19 | 32 | 49 |
| B7 & B8 | 64.3 | 9.7 | 98 | 131 | 190 | 314 | 400 | 22 | 7 | 71 |
| B9 & B10 | 63.4 | 9.1 | 92 | 139 | 220 | 354 | 411 | 13 | 19 | 68 |
| B11 & B12 | 56.0 | 9.7 | 93 | 130 | 249 | 385 | 418 | 23 | 41 | 36 |
| B13 & B14 | 64.4 | 9.7 | 98 | 145 | 217 | 299 | 385 | 17 | 3 | 80 |
| B15 & B16 | 63.0 | 8.9 | 92 | 141 | 226 | 350 | 414 | 13 | 19 | 68 |
| B17 & B18 | 54.5 | 9.3 | 93 | 131 | 215 | 321 | 398 | 43 | 5 | 52 |
| B19 & B20 | 56.8 | 9.0 | 93 | 131 | 208 | 317 | 393 | 40 | 14 | 46 |
| Program C: | | | | | | | | | | |
| C1 to C8 | 62.1 | 9.1 | 80 | 124 | 204 | 313 | 398 | 24 | 1 | 75 |
| C9 to C18 | 67.1 | 9.5 | 84 | 123 | 195 | 287 | 353 | 11 | 23 | 66 |

Referring to Table 1, three different programs of fuels A, B, and C were employed. Program A involved a total of twenty fuels in four groupings; Program B involved twenty fuels in ten groupings; and Program C involved eighteen fuels in two groupings. The data given for each grouping of fuel for each program is as follows:

(1) Gravity:

$$°API = \frac{141.5}{SG} - 131.5$$

where the specific gravity of the fuel is expressed in degrees according to an American Petroleum Institute scale and SG is the specific gravity of the total fuel mixture, including antiknock additives, at 60° Fahrenheit.

(2) Reid vapor pressure: the vapor pressure of the (II) 75 wt. percent TML/25 wt. percent TEL $(C_2H_5)_4Pb$ (270° F., Avg. B.P.)

| C-2 | 1.16 | 22.4 | 32.7 | 77.6 | 67.3 |
|---|---|---|---|---|---|
| C-6 | 2.33 | 22.4 | 32.6 | 77.6 | 67.4 |
| C-10 | 1.16 | 19.4 | 31.8 | 80.6 | 68.2 |
| C-15 | 2.24 | 19.2 | 31.5 | 80.8 | 68.5 |

(III) 50 wt. percent TML/50 wt. percent TEL (310° F., Avg. B.P.)

| C-3 | 1.14 | 22.4 | 41.2 | 77.6 | 58.8 |
|---|---|---|---|---|---|
| C-11 | 1.12 | 19.0 | 41.0 | 81.0 | 59.0 |
| C-16 | 2.26 | 19.2 | 40.8 | 80.8 | 59.2 |

(IV) 5.7 wt. percent TML/23.8 wt. percent Trimethyl ethyl lead; $(CH_3)_3(C_2H_5)Pb/37.5$ wt. percent Dimethyl diethyl lead; $(CH_3)_2(C_2H_5)_2Pb/26.2$ wt. percent methyl triethyl lead; $(CH_3)(C_2H_5)_3Pb/6.8$ wt. percent TEL (321° F., Avg. B.P.)

| | | | | | |
|---|---|---|---|---|---|
| C-4 | 1.10 | 22.0 | 48.2 | 78.0 | 51.8 |
| C-7 | 2.44 | 23.6 | 47.7 | 76.4 | 52.3 |
| C-12 | 1.15 | 18.4 | 46.0 | 81.6 | 54.0 |
| C-17 | 2.25 | 19.4 | 49.2 | 80.6 | 50.8 |

(V) TEL (390° F., B.P.)

| | | | | | |
|---|---|---|---|---|---|
| A-1 | 0.98 | 20.4 | 59.6 | 79.6 | 40.4 |
| A-3 | 3.07 | 19.4 | 60.1 | 80.6 | 39.9 |
| A-5 | 1.01 | 19.0 | 62.6 | 81.0 | 37.4 |
| A-7 | 3.21 | 17.6 | 56.5 | 82.4 | 43.5 |
| A-9 | 1.03 | 21.8 | 58.4 | 78.2 | 41.6 |
| A-11 | 3.09 | 20.8 | 59.0 | 79.2 | 41.0 |
| A-13 | 1.10 | 26.6 | 58.4 | 73.4 | 41.6 |
| A-15 | 3.16 | 25.8 | 56.2 | 74.2 | 43.8 |
| B-1 | 2.12 | 17.0 | 54.5 | 83.0 | 45.5 |
| B-3 | 2.08 | 16.4 | 56.3 | 83.6 | 43.7 |
| B-5 | 2.17 | 26.0 | 59.9 | 74.0 | 40.1 |
| B-7 | 2.09 | 15.8 | 55.0 | 84.2 | 45.0 |
| B-9 | 2.12 | 22.0 | 58.0 | 78.0 | 42.0 |
| B-11 | 3.29 | 28.4 | 58.0 | 71.6 | 42.0 |
| B-13 | 3.39 | 18.0 | 55.0 | 82.0 | 45.0 |
| B-15 | 3.26 | 22.8 | 56.8 | 77.2 | 43.2 |
| B-17 | 3.31 | 22.4 | 55.0 | 77.6 | 45.0 |
| B-19 | 3.34 | 21.2 | 57.2 | 78.8 | 42.8 |
| C-8 | 2.61 | 24.4 | 54.0 | 75.6 | 46.0 |
| C-13 | 1.23 | 20.0 | 55.3 | 80.0 | 44.7 |
| C-18 | 2.35 | 20.0 | 58.8 | 80.0 | 41.2 |

NOTES:
1. All fuel volume percentages are based on the total volume of fuel entering the manifold from the carburetor.
2. All lead volume percentages are based on the total volume of lead alkyl antiknock additive entering the manifold from the carburetor.

Referring to Table 2, tetramethyl lead (TML) with a boiling point of 230° Fahrenheit was included in certain ones of the program A, B and C fuels. Division I of Table 2 designates these fuels. Division II designates certain ones of the program C fuels containing three parts by weight of TML and one part by weight of TEL as an antiknock additive, with an average boiling point of 270° Fahrenheit for the additive. Division III designates certain ones of the program C fuels containing equal parts of TML and TEL, with an average boiling point of 310° Fahrenheit for the lead alkyl additive. Division IV designates certain ones of the program C fuels containing: 5.7% by weight TML, 23.8% by weight trimethyl ethyl lead, 37.5% by weight dimethyl diethyl lead, 26.2% by weight methyl triethyl lead, and 6.8% by weight TEL, with an average boiling point of 321° Fahrenheit for the lead alkyl additive. Finally, Division V designates certain ones of the program A, B, and C fuels containing TEL as a lead alkyl antiknock additive having a boiling point of 390° Fahrenheit.

Each of the fuel mixtures, as designated in Divisions I–V of Table 2, was used to power a standard single cylinder ASTM CFR engine under Research Test conditions, the fuel being applied to the engine through the entrainment manifold described above which was maintained at a temperature of 40° Fahrenheit. The amount of condensate bled from the manifold through the outlet member 48 for each fuel mixture was measured and analyzed to determine the volume percent of the total fuel mixture withdrawn from the manifold as well as the volume percent of the lead alkyl additive withdrawn (with respect to the total amount of lead alkyl present). The columns of figures in Table 2 under the heading "Volume Percent Withdrawn" tabulate this data. Table 2 also gives the volume percentages of fuel and lead alkyl antiknock additive applied to the engine, which, of course, includes the amount of condensate reentrained by the action of the trough 46. This data was determined by subtracting from the amounts of total mixture and lead alkyl additive applied to the manifold the amounts bled away, and is tabulated in Table 2 under the heading "Volume Percent to Engine."

Table 3, following, tabulates further data regarding the program A fuels containing either TEL or TML as the lead alkyl antiknock additive.

TABLE 3

*Separation characteristics of distribution manifold*

| Fuel | Lead Type | Total Volume Percent Condensed | | Volume Percent Re-entrained | |
|---|---|---|---|---|---|
| | | Fuel | Lead | Fuel | Lead |
| A1 | TEL | 26.0 | 73.5 | 5.6 | 13.9 |
| A2 | TML | 26.0 | 34.4 | 5.6 | 6.9 |
| A3 | TEL | 26.6 | 74.4 | 7.2 | 14.3 |
| A4 | TML | 25.6 | | 6.2 | |
| A5 | TEL | 24.0 | 72.2 | 5.0 | 9.6 |
| A6 | TML | 23.6 | 35.2 | 5.4 | 10.2 |
| A7 | TEL | 24.0 | 71.2 | 6.4 | 14.7 |
| A8 | TML | 23.4 | 32.0 | 6.0 | 10.0 |
| A9 | TEL | 26.8 | 69.5 | 5.0 | 11.1 |
| A10 | TML | 26.6 | 35.0 | 4.6 | 10.4 |
| A11 | TEL | 26.4 | 69.7 | 5.6 | 10.7 |
| A12 | TML | 26.8 | | 5.6 | |
| A13 | TEL | 32.6 | 71.5 | 6.0 | 13.1 |
| A14 | TML | 33.0 | 35.2 | 6.2 | 7.2 |
| A15 | TEL | 33.8 | 71.9 | 8.0 | 15.7 |
| A16 | TML | 32.8 | 34.7 | 6.0 | 7.4 |

NOTES:
1. All fuel volume percentages are based on the total volume of fuel entering the manifold from the carburetor.
2. All lead volume percentages are based on the total volume of lead alkyl antiknock additive entering the manifold from the carburetor Table 3 is to be read in conjunction with Table 2 and gives the total volume percentages of the fuel mixture and the lead alkyl additive that were condensed in the entrainment manifold, as well as the volume percentages of the fuel mixture and the lead alkyl additive that were reentrained. This data was obtained by employing the manifold 12 of FIG. 2 without the trough 46, and measuring the amount of the condensate bled away through the outlet member 48 during a predetermined engine run for each of the program A fuels. These measured amounts of bled condensate were taken to represent the amounts condensed within the manifold, and are tabulated in Table 3 under the heading Total Volume Percent Condensed. The same fuels under the same engine operating conditions were then subjected to another series of tests in which the trough 46 was positioned within the manifold and the amounts bled away through the outlet member 48 were measured. The differences between the measured amounts of fuel passing through the outlet member 48 in the two series of tests were taken to represent the amounts of fuel reentrained into the mixture applied to the engine. These differences are tabulated in Table 3 in the columns of figures under the heading Volume Percent Reentrained.

Figure 6:
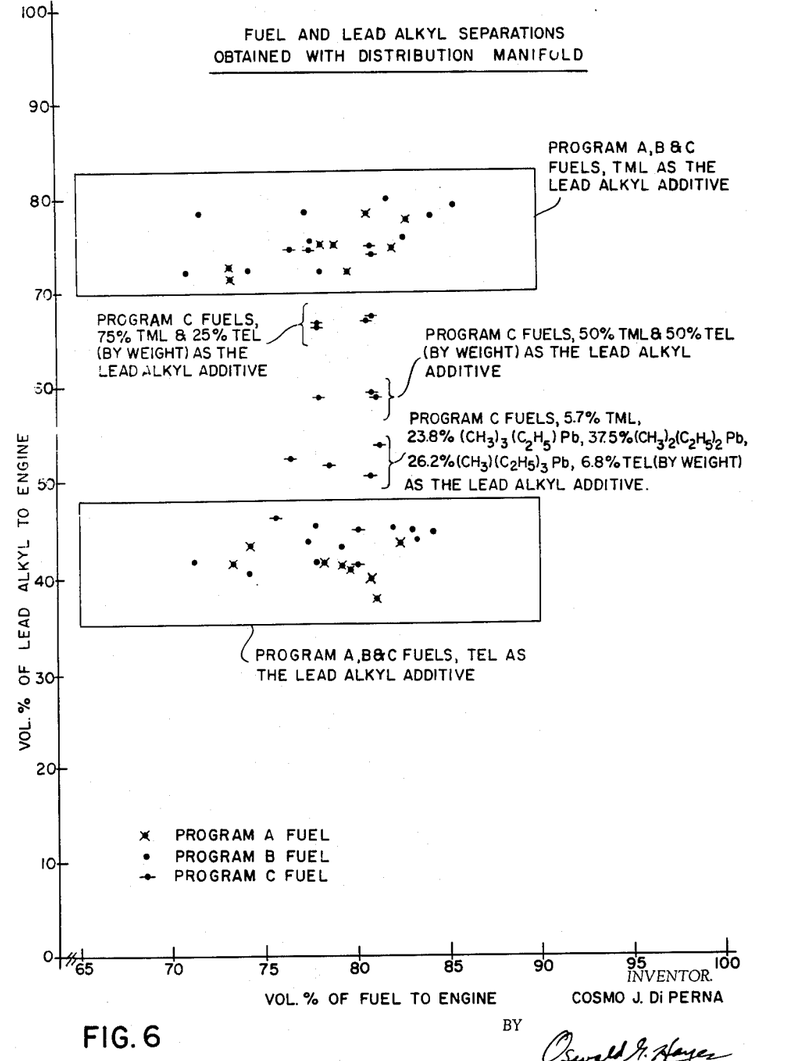
FIGS. 6–9, inclusive, are plots of experimental data obtained with a conventional ASTM laboratory octane engine fitted with an improved bled manifold, according to the invention, showing the following relationships, respectively, for a number of typical fuel mixtures: the volume percent of lead alkyl fed to the engine versus volume percent of fuel to the engine; the volume percent of lead alkyl supplied to the engine versus the average boiling point of the lead alkyl in the fuel; the volume percent of fuel fed to the engine versus the ASTM 50% evaporation temperature of the fuel; and the volume percent of fuel fed to the engine versus one-half the ASTM 50% evaporation temperature of the fuel plus one-half the ASTM 90% evaporation temperature.

FIG. 6 presents a graphical plot of a portion of the data presented in Table 2. Specifically, volume percent of lead alkyl to the engine is plotted versus volume percent of fuel to the engine. As may be seen from the figure, the program A, B, and C fuels which contained TML as the lead alkyl antiknock additive are grouped in a range which broadly represents 65 to 90% of the fuel and 70 to 83% of the lead alkyl additive to the engine. On the other hand, the program A, B and C fuels which contained TEL as the lead alkyl antiknock additive are grouped in a range broadly defined by the same volume percentages of fuel to the engine, but represented by roughly 35 to 48% of the lead alkyl additive to the engine. The other program C fuels which contained varying proportions of TML and TEL and other lead alkyl antiknock additives are grouped within the same range of volume percentages of fuel to the engine, but are located intermediate the ranges representing TML and TEL antiknock adidtive applied to the engine.

The ranges shown in FIG. 6 represent desired ranges insofar as octaine number determinations are concerned using the standard ASTM CFR engine under Research Test conditions. If the volume percentages of fuel and lead alkyl additive to the engine fall within the ranges shown, it has been found that the octane numbers determined thereby correlate closely with those determined by actual road test.

Thus, insofar as the method of the invention is concerned, if a fuel is known to have only TML as an antiknock additive, the fuel should be modified in the laboratory so that, when applied to an ASTM engine operating under Research Test conditions, only from 65 to 90% of the total mixture is applied to the engine, which includes from 70 to 83% of the TML additive, to obtain results which correlate well with road octane number determinations. If the fuel is known to have only TEL as an antiknock additive, on the other hand, the same fuel mixture percentage is supplied to the engine, but only from 35 to 48% of the TEL additive is supplied. Similar relationships hold for other fuel mixtures.

Figure 7:
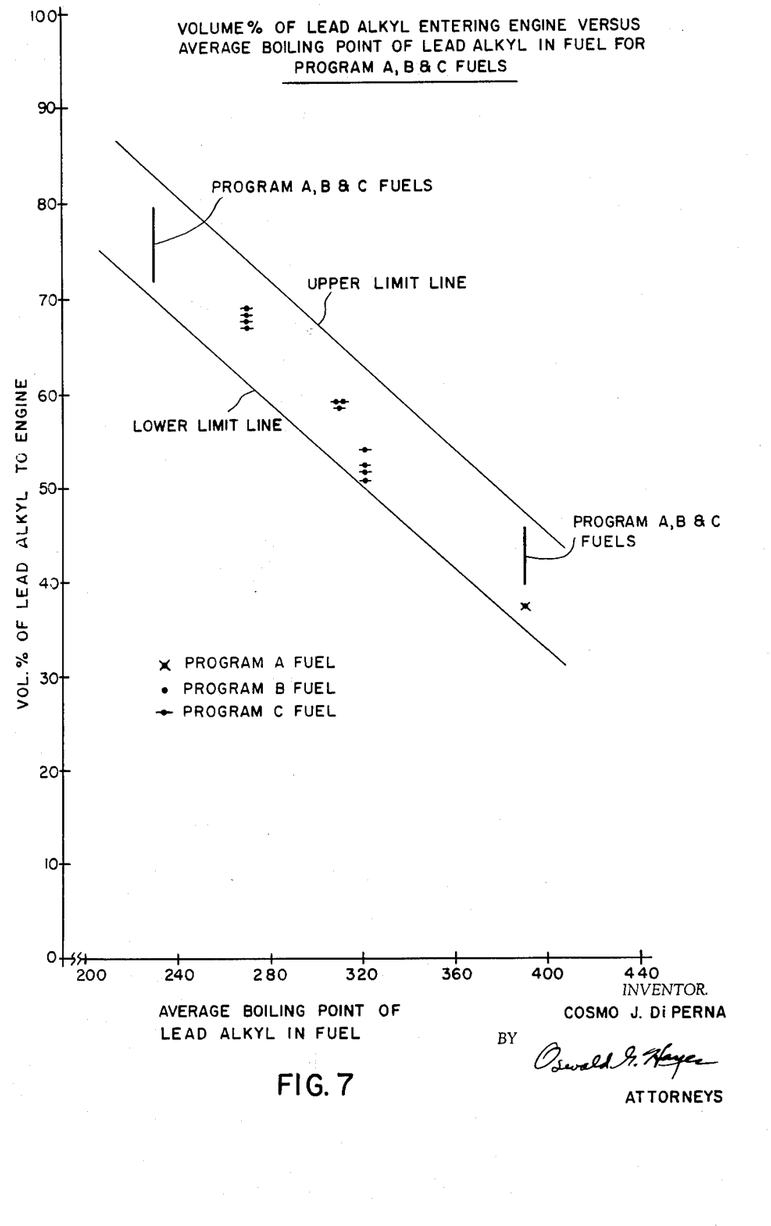

FIG. 7 presents a further plot of a portion of the data tabulated in Table 2, showing the volume percent of lead alkyl antiknock additive applied to the engine versus the average boiling point (A.B.P.) of the lead alkyl component. The data falls into a fairly well defined band which is bounded by an upper limit line and a lower limit line, as shown in the figure. The equation of the upper limit line may be expressed generally as:

$$\text{Lead alkyl percent} = 133 - \frac{7}{32} \text{A.B.P.} \quad (1)$$

while the equation of the lower limit line may be expressed generally as:

$$\text{Lead alkyl percent} = 120 - \frac{7}{32} \text{A.B.P.} \quad (2)$$

where A.B.P. is the average boiling point in degrees Fahrenheit of the lead alkyl additive.

Thus, for any given average boiling point of a lead alkyl additive, the range of volume percent of lead alkyl that should be applied to the engine may be easily determined.

Figure 8:
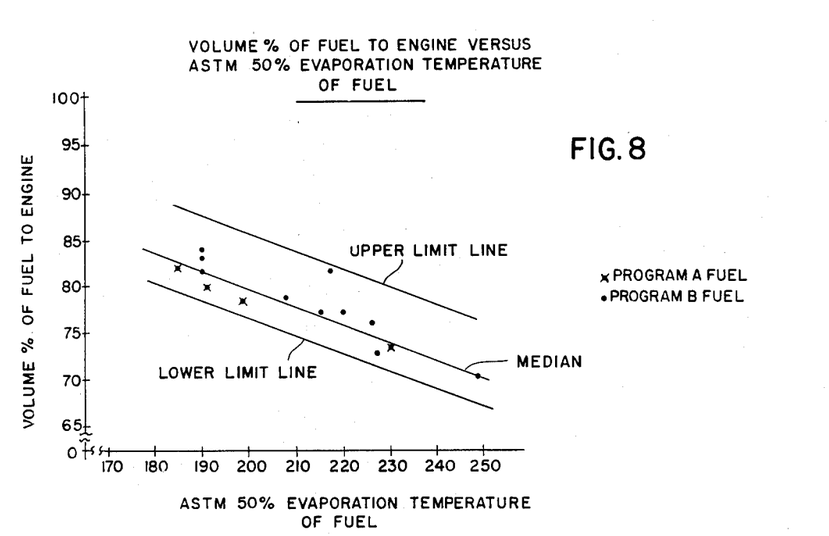

FIG. 8 is a plot of volume percent of fuel to the engine versus the ASTM 50% evaporation temperature of the fuel. The data for this figure is taken from Tables 1 and 2. As may be seen, the plotted points are grouped about a median line and fall within a band defined by an upper limit line and a lower limit line. The equation for the upper limit line may be expressed generally as:

$$\text{Fuel percent} = 124 - \frac{2.3}{12} \text{Ev. } T_1 \quad (3)$$

while the equation for the lower limit line may be expressed generally as:

$$\text{Fuel percent} = 115 - \frac{2.3}{12} \text{Ev. } T_1 \quad (4)$$

where $Ev.T_1$ is the ASTM 50% evaporation temperature in degrees Fahrenheit of the mixture. Thus, given any 50% evaporation temperature of a fuel mixture, a range of volume percent of a fuel that should be applied to the ASTM engine may be easily determined.

Figure 9:
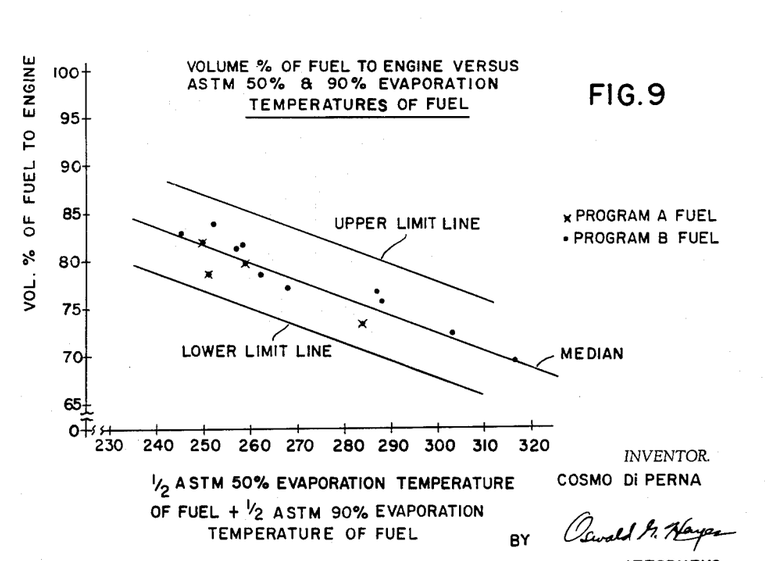

FIG. 9 is a plot of data which is similar to that of FIG. 8 showing, however, the volume percent of fuel to the engine versus one-half the ASTM 50% evaporation temperature of the fuel mixture plus one-half the 90% temperature of the fuel. The data for this figure, like FIG. 8, is taken from Tables 1 and 2. Again, the plotted points fall into a fairly well defined band which is bounded by an upper limit line and a lower limit line. The equation for the upper limit line may be expressed generally as:

$$\text{Fuel percent} = 131 - \frac{3}{17} \text{Ev. } T_2, \quad (5)$$

while the lower limit line may be expressed generally as:

$$\text{Fuel percent} = 121 - \frac{3}{17} \text{Ev. } T_2, \quad (6)$$

where $Ev.T_2$ is one-half the ASTM 50% evaporation temperature in degrees Fahrenheit of the mixture plus one-half the ASTM 90% evaporation temperature in degrees Fahrenheit of the mixture.

Thus, regarding the method of the invention, using either of FIGS. 8 and 9 and FIG. 7, the critical volume percentages of fuel mixture and lead alkyl antiknock additive to be applied to the ASTM CFR engine may be determined in terms of the ASTM evaporation temperature of the fuel and the average boiling point of the lead alkyl additive, respectively, to provide a fuel mixture which is of such a quality and composition as to provide a fuel rating in the test engine which will correlate well with the rating determined for the same fuel by an actual road test. It should be apparent that while the tabulated data and figures relate to the ASTM Research Test, the same principles apply to other tests.

Figures 4, 5:
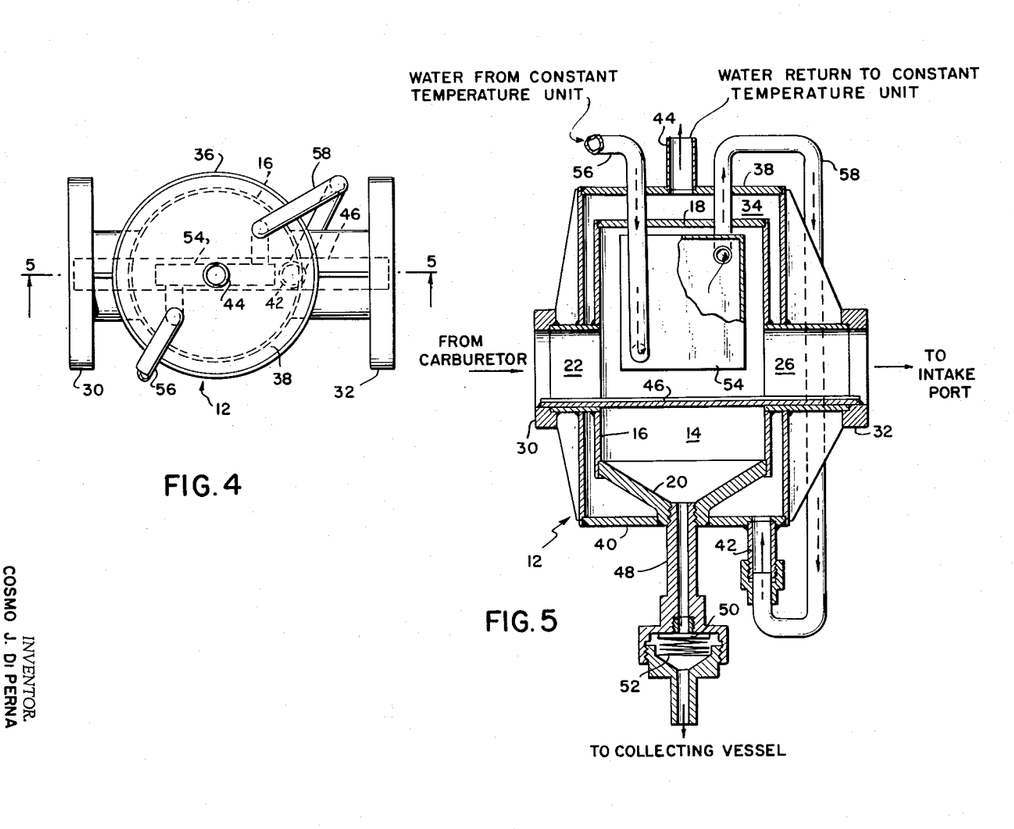
FIG. 4 is a top view of another form of manifold in accordance with the invention, incorporating a condenser in the manifold chamber.
FIG. 5 is a sectional view of the manifold shown in FIG. 4, taken very generally along the section line 5—5 of that figure and looking in the direction of the arrows.

FIGS. 4 and 5 show an entertainment manifold incorporating a condenser 54 above the trough 46 in the chamber 14. The condenser 54 comprises a hollow box-like structure having an inlet pipe 56 which receives a liquid such as water from a constant temperature unit (not shown). Water from the constant temperature unit flows into the condenser 54 and out of the condenser through an outlet pipe 58 to the inlet pipe 42 of the chamber 34 surrounding the manifold chamber 14. The water flows through the chamber 34 and out of the outlet pipe 44 to return to the constant temperature unit. As may be noted then, the walls of the chamber 14 are maintained at a predetermined temperature as is the condenser 54 included within the chamber 14. Accordingly, the interior surfaces of the chamber 14 and the exterior surfaces of the condenser 54 constitute cooling surfaces defining a passage in the manifold system for condensing a portion of the fuel passing therethrough. The fuel-air mixture from the carburetor applied to the chamber 14 through the inlet 22 is affected by both the temperature of the walls of the chamber 14 and the temperature of the condenser 54 to condense varying portions of the fuel out of the mixture. A useful temperature has been found from practice to be 40° Fahrenheit.

Although the method of the invention has been described above with reference to a manifold for modifying the fuel mixture applied to the laboratory testing engine, the proper modification, as determined with reference to the figures and tables described above which establish the critical percentages of the fuel and antiknock components actually applied to the engine, may be effected by other means. For example, a particular fuel may be modified entirely in the laboratory by a technician using known distillation techniques and establishing the proper mixture, and the modified mixture may then be applied to the carburetor of the standard testing engine without the use of any intermediate manifold. Alternatively, the initial separation of volatile and non-volatile fuel fractions can be accomplished by distillation, centrifuging, or impingement techniques, for example. Subsequent entrainment of the non-volatile fuel components could then be effected by suitable means such as various baffle configurations, while the remainder of the non-volatile fuel components is drained away.

Also, it is possible to obtain results somewhat better than those obtainable with bled manifolds of the type heretofore employed in the prior art, by using a manifold similar to that shown in FIGS. 2 or 5, with the trough 46 omitted and the temperature being maintained at roughly 40° F. However, the results are considerably inferior to those obtained where there in reentrainment of some of the condensed fuel as described above. Moreover, some improvement over the prior art, apparently attributable to reduced fractionation of the fuel mixture, can also be achieved with a manifold similar to that of FIG. 2, except that the trough 46 is omitted, the inlet 22 being positioned at the top left-hand side of the chamber 14 and the outlet 26 being positioned at the bottom right-hand side of the chamber.

In summary, an improved laboratory method of and apparatus for determining low speed road octane numbers of fuels has been provided which establishes critical fuel and antiknock additive percentages of a fuel mixture that should be applied to a laboratory testing engine to simulate the fuel-air mixture applied to an automobile engine under a road test and to correlate more closely octane number determinations carried out in the laboratory with those carried out in the road test.

The several forms of the invention disclosed herein are intended to be merely illustrative and the invention should not be limited except as it is defined in the following claims.

I claim:

1. In a method of operating a laboratory type engine to determine the octane rating of a combustible mixture under test that is applied to the engine, the steps of:
 (a) condensing from 10% to 35% of the combustible mixture before it is applied to the engine, thereby to produce a condensate,
 (b) adding a portion of the condensate to the part of the combustible mixture not condensed to produce a modified mixture, and
 (c) applying the modified mixture to the engine to power the engine.

2. In a method of operating a laboratory type engine to determine the octane rating of a combustible mixture that is formed at least in part from a plurality of different hydrocarbons, the steps of:
 (a) condensing a sufficient number of said different hydrocarbons before the mixture is applied to the engine to remove from 10% to 35% of the combustible mixture,
 (b) adding a portion of said condensed hydrocarbons to the part of the mixture not condensed to produce a modified mixture, and
 (c) applying the modified mixture to the engine to power the engine.

3. In a method of operating a laboratory type engine to determine the octane rating of a combustible mixture that includes a lead alkyl component, the steps of:
 (a) applying substantially no more than 90% and no less than 65% of the mixture to the engine, the portion of the mixture applied to the engine varying substantially linearly with respect to the ASTM evaporated temperature of the mixture, with 90% corresponding to relatively volatile mixtures and 65% corresponding to relatively less volatile mixtures, this portion of the mixture including
  (1) substantially no more than 83% and no less than 35% of the lead alkyl component, the portion of the lead alkyl component applied to the engine varying substantially linearly with respect to the average boiling point of the lead alkyl component, with 83% corresponding to lead alkyl components of relatively low average boiling points and 35% corresponding to lead alkyl components of relatively high average boiling points.

4. The method as recited in claim 3, wherein the relatively volatile mixtures are those having 50% evaporated temperatures substantially between 170° and 190° Fahrenheit, wherein the relatively less volatile mixtures are those having 50% evaporated temperatures substantially between 235° and 250° Fahrenheit, wherein the lead alkyl components of relatively low average boiling points are those having average boiling points substantially between 220° and 240° Fahrenheit, and wherein the lead alkyl components of relatively high average boiling points are those having average boiling points substantially between 380° and 400° Fahrenheit.

5. In a method of operating a laboratory type engine to determine the octane number of a combustible mixture that includes a lead alkyl component, the steps of:
 (a) applying substantially no more than 90% and no less than 65% of the mixture to the engine, the portion of the mixture applied to the engine varying substantially linearly with respect to the ASTM evaporated temperature of the mixture, with 90% corresponding to relatively volatile mixtures and 65% corresponding to relatively less volatile mixtures, this portion of the mixture including one of the following percentages of the lead alkyl component:
  (1) substantially no more than 83% and no less than 70% if the lead alkyl component is tetramethyl lead,
  (2) substantially no more than 48% and no less than 35% if the lead alkyl component is tetraethyl lead.

6. In a method of operating a laboratory type engine to determine the octane number of a combustible mixture that includes a lead alkyl component, the steps of:
 (a) applying substantially no more than 90% and no less than 65% of the mixture to the engine, the portion of the mixture applied to the engine varying substantially linearly with respect to the ASTM evaporated temperature of the mixture, with 90% corresponding to relatively volatile mixtures and 65% corresponding to relatively less volatile mixtures, this portion of the mixture including
  (1) substantially no more than $$\left(133 - \frac{7}{32} \text{ A.B.P.}\right) \text{percent}$$

and no less than $$\left(120 - \frac{7}{32} \text{ A.B.P.}\right) \text{percent}$$

of the lead alkyl component, where A.B.P. is the average boiling point in degrees Fahrenheit of the lead alkyl component.

7. In a method of operating a laboratory type engine to determine the octane rating of a combustible mixture that includes a lead alkyl component, the steps of:
 (a) applying substantially no more than $$\left(124 - \frac{2.3}{12} \text{ Ev. } T_1\right) \text{percent}$$

and no less than $$\left(115 - \frac{2.3}{12} \text{ Ev. } T_1\right) \text{percent}$$

of the mixture to the engine, where Ev.$T_1$ is the ASTM 50% evaporation temperature in degrees Fahrenheit of the mixture, this portion of the mixture including:
  (1) substantially no more than $$\left(133 - \frac{7}{32} \text{ A.B.P.}\right) \text{percent}$$

and no less than $$\left(120 - \frac{7}{32} \text{ A.B.P.}\right) \text{percent}$$

of the lead alkyl component, where A.B.P. is the average boiling point in degrees Fahrenheit of the lead alkyl component.

8. In a method of operating a laboratory type engine to determine the octane rating of a combustible mixture that includes a lead alkyl component, the steps of:
 (a) applying substantially no more than $$\left(131 - \frac{3}{17} \text{ Ev. } T_2\right) \text{percent}$$

and no less than $$\left(121 - \frac{3}{17} \text{ Ev. } T_2\right) \text{percent}$$

of the mixture to the engine, where Ev.$T_2$ is one half the ASTM 50% evaporation temperature in degrees Fahrenheit of the mixture plus one half the ASTM 90% evaporation temperature in degrees Fahrenheit of the mixture, this portion of the mixture including:

(1) substantially no more than $$\left(133 - \frac{7}{32} \text{ A.B.P.}\right) \text{ percent}$$

and no less than $$\left(120 - \frac{7}{32} \text{ A.B.P.}\right) \text{ percent}$$

of the lead alkyl component, where A.B.P. is the average boiling point in degrees Fahrenheit of the lead alkyl component.

9. In the combination of a single-cylinder internal-combustion engine and a manifold system for supplying a charge mixture of fuel and air to said engine, the fuel containing components boiling at different temperatures, which combination is arranged and adapted for variation of engine operating parameters and detection of character of combustion in the cylinder of said engine to determine the knocking propensity of a fuel, the improvement comprising charge-mixture-modifying means in said manifold system for causing the combination to simulate operation of a cylinder in a multi-cylinder engine, which modifying means comprises cooling surfaces defining a passage in said system for condensing a portion of the fuel, means for separating the resultant condensate into two portions of like composition, means for rejecting one of said portions from the combination unburned, and means for introducing to the cylinder of said engine the other of said portions together with the remainder of said charge mixture for combustion in the cylinder of said engine; whereby the charge burned in said cylinder simulates the charge to at least one typical cylinder of a multi-cylinder engine as modified by condensation and partial entrainment of condensate during flow through the fuel intake manifold of such multi-cylinder engine.

References Cited by the Examiner

UNITED STATES PATENTS

| | | | |
|---|---|---|---|
| 1,723,954 | 8/29 | Selfringe | 123—122 |
| 1,990,662 | 2/35 | Moore | 123—122 |
| 2,061,043 | 11/36 | Philip | 165—154 X |
| 2,281,694 | 5/42 | Huber | 123—41.31 |

OTHER REFERENCES

Abstract of "New Knock Testing Methods Needed to Match Fuel-Engine Progress," by Earl Bartholomew, S.A.E. Journal, vol. 69, May–Aug. 1961, pages 41–45, May 1961.

RICHARD C. QUEISSER, *Primary Examiner.*

UNITED STATES PATENT OFFICE
CERTIFICATE OF CORRECTION

Patent No. 3,198,002  
August 3, 1965

Cosmo J. Di Perna

It is hereby certified that error appears in the above numbered patent requiring correction and that the said Letters Patent should read as corrected below.

Column 5, lines 5 and 6, for "laboratoy" read -- laboratory --; column 8, line 67, for "adidtive" read -- additive --; line 69, for "octaine" read -- octane --; column 9, line 55, strike out "a"; column 10, line 16, for "entertainment" read -- entrainment --; line 66, for "in" read -- is --.

Signed and sealed this 8th day of February 1966.

(SEAL)  
Attest:

ERNEST W. SWIDER  
Attesting Officer

EDWARD J. BRENNER  
Commissioner of Patents